United States Patent
Kemmer et al.

(10) Patent No.: US 9,456,373 B2
(45) Date of Patent: Sep. 27, 2016

(54) CELL SEARCH METHOD AND COMMUNICATION TERMINAL

(71) Applicant: Intel IP Corporation, Santa Clara, CA (US)

(72) Inventors: Bernd Kemmer, Eichenau (DE); Ahmed Khodeir, Alexandria (EG)

(73) Assignee: INTEL IP CORPORATION, Santa Clara, CA (US)

( * ) Notice: Subject to any disclaimer, the term of this patent is extended or adjusted under 35 U.S.C. 154(b) by 59 days.

(21) Appl. No.: 14/287,086

(22) Filed: May 26, 2014

(65) Prior Publication Data

US 2015/0341813 A1 Nov. 26, 2015

(51) Int. Cl.
| | |
|---|---|
| H04W 24/10 | (2009.01) |
| H04W 48/16 | (2009.01) |
| H04L 12/26 | (2006.01) |
| H04W 36/14 | (2009.01) |
| H04W 72/00 | (2009.01) |
| H04J 11/00 | (2006.01) |
| H04W 16/14 | (2009.01) |
| H04W 16/02 | (2009.01) |

(52) U.S. Cl.
CPC .......... *H04W 24/10* (2013.01); *H04L 43/0894* (2013.01); *H04W 36/14* (2013.01); *H04W 48/16* (2013.01); *H04W 72/00* (2013.01); *H04J 11/0069* (2013.01); *H04W 16/02* (2013.01); *H04W 16/14* (2013.01)

(58) Field of Classification Search
None
See application file for complete search history.

(56) References Cited

U.S. PATENT DOCUMENTS

| | | | | | |
|---|---|---|---|---|---|
| 6,021,269 | A | * | 2/2000 | Lewis .................. | G01S 5/0009 324/76.19 |
| 6,148,203 | A | * | 11/2000 | Renko .................. | H04W 48/16 455/166.1 |
| 6,553,229 | B1 | * | 4/2003 | Dent .................... | H03J 1/0075 370/347 |
| 8,688,144 | B1 | * | 4/2014 | Alexander ........ | H04M 1/72572 455/456.1 |
| 8,718,641 | B2 | * | 5/2014 | Baek .................... | H04J 11/0076 455/434 |
| 2007/0211669 | A1 | * | 9/2007 | Umatt .................. | H04W 48/18 370/335 |
| 2012/0208528 | A1 | * | 8/2012 | Wilhelmsson ........ | H04W 48/16 455/423 |
| 2013/0121218 | A1 | * | 5/2013 | Lu ........................ | H04W 60/00 370/281 |
| 2013/0155883 | A1 | * | 6/2013 | Bhattacharjee ....... | H04W 48/16 370/252 |
| 2014/0099941 | A1 | * | 4/2014 | Ji .......................... | H04W 48/12 455/423 |

* cited by examiner

*Primary Examiner* — Bunjob Jaroenchonwanit
(74) *Attorney, Agent, or Firm* — Viering, Jentschura & Partner mbB

(57) ABSTRACT

A cell search method is described comprising searching for a frequency at which a communication network operates a radio cell within a predetermined set of candidate frequencies; determining a frequency at which a communication network operates a radio cell within the set of candidate frequencies; excluding a sub-set with a predetermined size of frequencies around the determined frequency from the set of candidate frequencies to generate an updated set of candidate frequencies; and continuing to search for a further frequency at which a communication network operates a radio cell within the updated set of candidate frequencies.

20 Claims, 10 Drawing Sheets

CELL SEARCH METHOD AND COMMUNICATION TERMINAL

TECHNICAL FIELD

Embodiments described herein generally relate to cell search methods and communication terminals.

BACKGROUND

A communication terminal using cellular communication networks needs to search for radio cells that it may use for communication, e.g. when it is powered on. Since the time necessary for the searching adds to the time for which a user has to wait starting from switching on the terminal and being able to communicate with it, it is typically desired to keep this time as short as possible for the convenience of the user. Accordingly, efficient approaches for a cell search are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
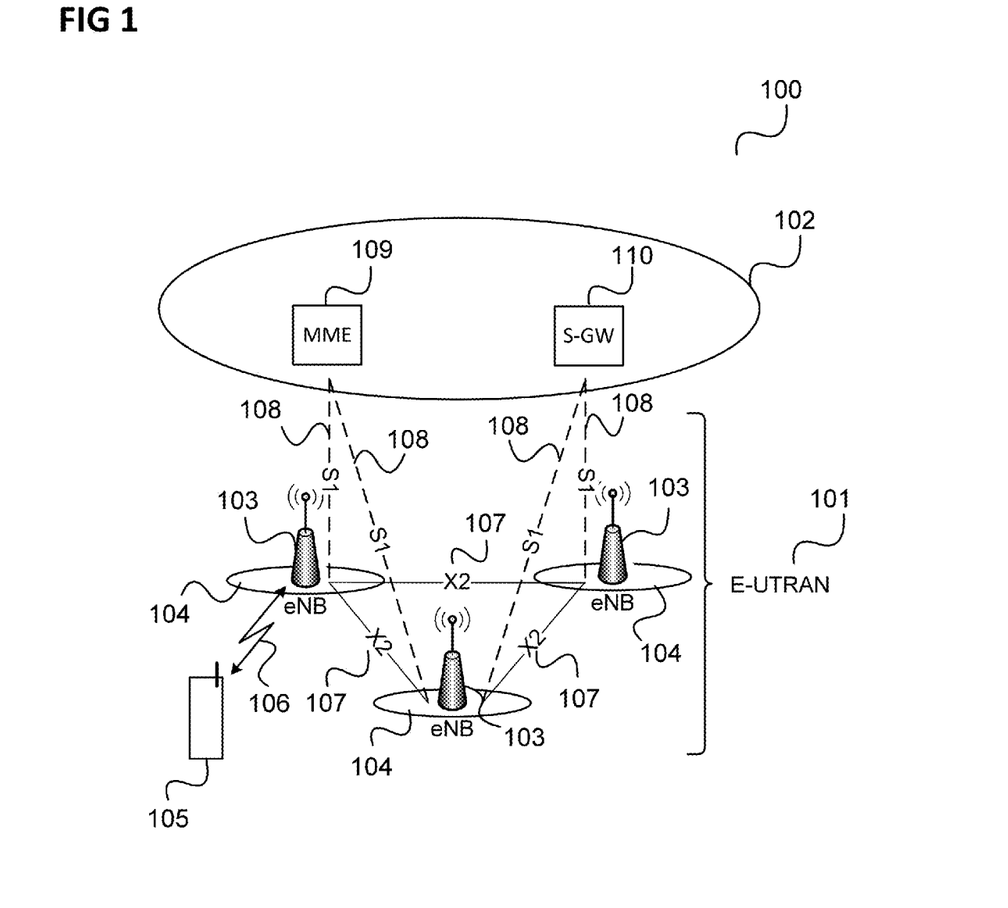
FIG. 1 shows a communication system according to a mobile communication standard, such as LTE.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

When the mobile terminal 105 is switched on (powered up), it determines in which radio cell (or radio cells in case of a plurality of networks being operated at its location) it is located. This is referred to as initial cell search. An example for an initial cell search procedure according to a mobile communication standard, such as LTE is illustrated in FIG. 2.

Figure 2:
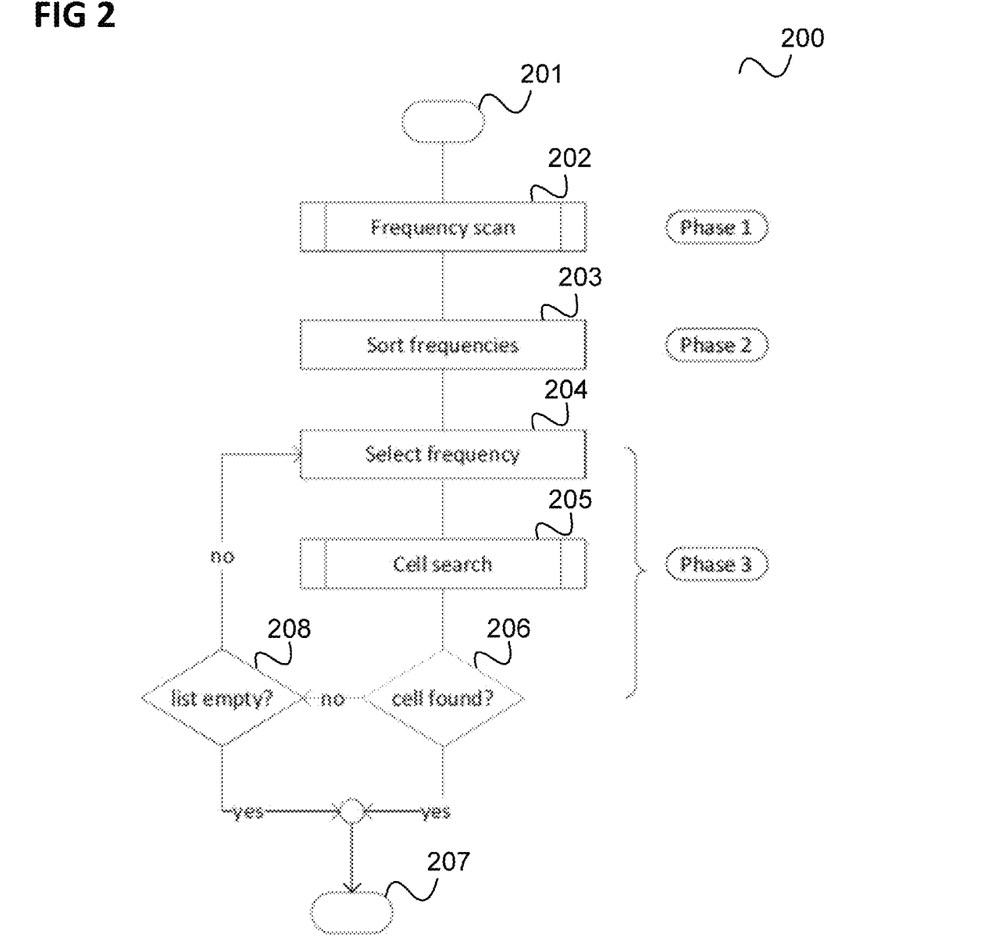
FIG. 2 shows a flow diagram illustrating an initial cell search procedure.

FIG. 2 shows a flow diagram 200.

The flow starts in 201.

In 202, the mobile terminal performs a frequency scan.

In 203, the mobile terminal reduces the frequencies acquired from the frequency scan and sorts them into a list of candidate frequencies.

In 204, the mobile terminal chooses a frequency candidate from the list of candidate frequencies and, in 205, performs a cell search on this frequency.

If, in 206, the mobile terminal has found a cell at this frequency the process ends in 207. If the mobile terminal has not found a cell at this frequency and the list of candidate frequencies is determined to be empty in 208, the process also ends in 207. Otherwise, another candidate frequency is selected in 204. In other words, the cell search is continued until either a wanted cell is found or the end of the candidate list has been reached.

One major contribution to the time required for the cell search procedure typically is the number of frequency candidates which are detected during the frequency scan of 202 and which are selected in 204. The more frequencies candidates are found for the cell search the longer the overall search time may last.

To reduce the overall search time one major goal would be to increase the probability that in 204 a frequency is chosen from that list of candidate frequency which carries the searched cell. For this, it is typically desirable to reduce the candidate list, i.e. the list of candidate frequencies, in its size by containing as less as possible but as much as needed entries, instead of including all possible frequencies to the candidate list.

Further, besides the pure number of detected frequencies and frequencies included in the candidate list also their order of their appearance is of high importance. The earlier the right candidate is chosen from the candidate list, the earlier the search can be finished. Accordingly, the candidate list may be sorted such that it includes the most promising candidates first.

The candidates can for example be ordered related to their detection criteria, e.g. according to their RSSI (Received Signal Strength Indication) values.

For example, one approach is that the mobile terminal scans the frequency band in which it wants to locate a radio cell, i.e. a frequency cell at which a radio cell is operated, and determines the available power levels, e.g. the RSSI for each frequency. In this case, the output of 202 is a list of paired frequency candidates and RSSI (received signal strength indicator) values.

In 203, the mobile terminal may apply a threshold to eliminate low signal strength candidates from the list to generate a reduced list. The frequencies included in the reduced list may then be sorted by decreasing RSSI values to generate a final candidate list.

In 204 and 205, the final candidate list is stepped through one by one until either the cell search on one of the included candidate frequencies has been successful or the end of the final candidate list is reached and the search is terminated unsuccessfully without finding a cell.

To further limit the number of frequency candidates already in 202, a correlation function (e.g. auto-correlation) may be used. This allows a better suppression of noise and interference impact than based on RSSI.

In this case, the output of the correlation based scan in 202 is a list of pairs of frequency and related probability value for that frequency determined by the correlation function.

In 203, the list may then be sorted by the probability values. Also, to reduce the size of the list a threshold value may be applied to remove all entries which are below this threshold. From the sorted list of candidates, beginning with the candidate frequency with highest probability value, the mobile terminal selects a frequency in 204 and initiates the actual cell search in 205 on that frequency. If no cell was found, the next lower probable candidate from that list is taken in 204 and so on.

Figure 3:
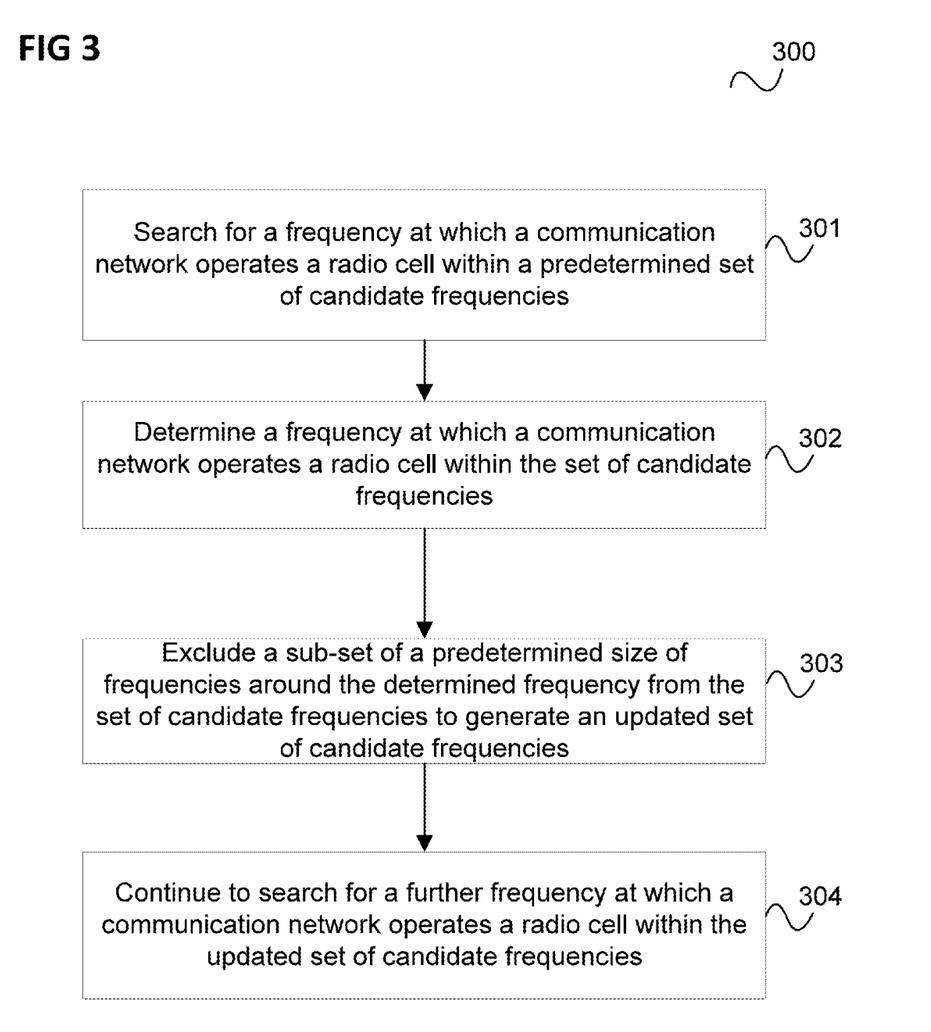
FIG. 3 shows a flow diagram illustrating a cell search method.

An approach which may be used to further reduce the cell search time is illustrated in FIG. 3.

FIG. 3 shows a flow diagram 300 illustrating a cell search method.

The cell search method is for example carried out by a communication terminal.

In 301, the communication terminal searches for a frequency at which a communication network operates a radio cell within a predetermined set of candidate frequencies.

In 302, the communication terminal determines a frequency at which a communication network operates a radio cell within the set of candidate frequencies.

In 303, the communication terminal excludes a sub-set with a predetermined size of frequencies (i.e. frequency size, in other words bandwidth) around the determined frequency from the set of candidate frequencies to generate an updated set of candidate frequencies.

In 304, the communication terminal continues to search for a further frequency at which a communication network operates a radio cell within the updated set of candidate frequencies.

In other words, when a cell has been found in the cell search, a certain range of frequencies is removed from the list of candidate frequencies. For example, when a cell has been found at a certain frequency, all frequencies that lie in the bandwidth of the cell (e.g. within an expected bandwidth, e.g. an expected minimum bandwidth of the cell) are excluded from the further search. This allows shortening the cell search in a wireless communication device, e.g. a mobile phone.

Figure 4:
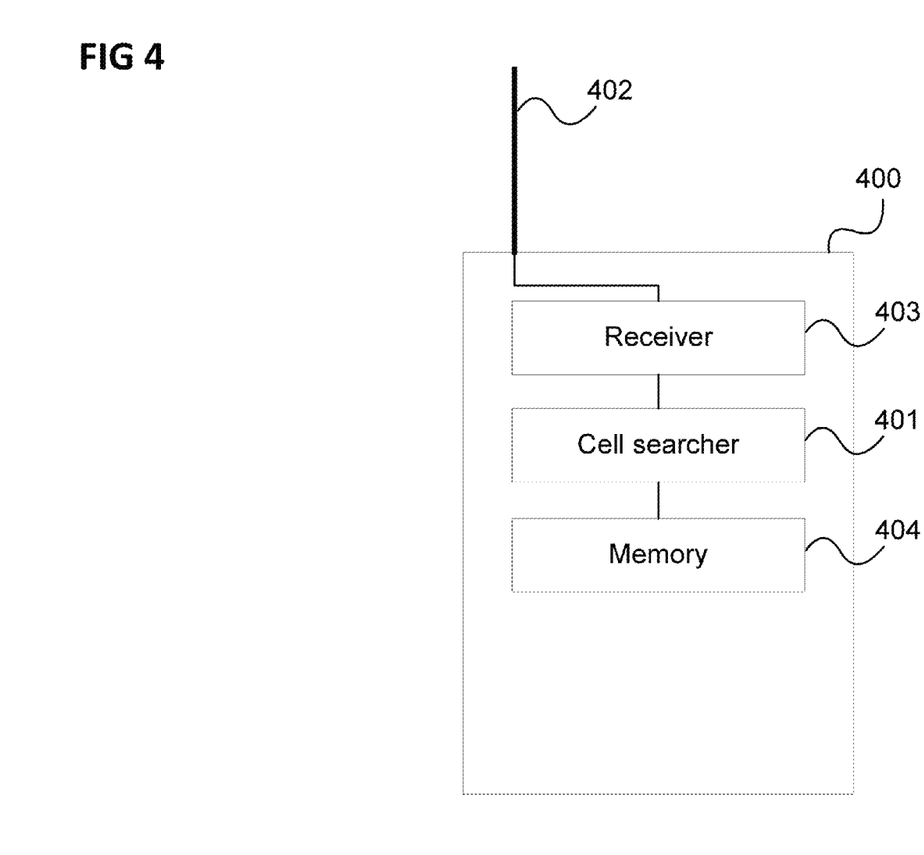
FIG. 4 shows a communication terminal.

The cell search method is for example carried out by a communication terminal as illustrated in FIG. 4.

FIG. 4 shows a communication terminal 400.

The communication terminal 400 includes a cell searcher 401 configured to search for a frequency at which a communication network operates a radio cell within a predetermined set of candidate frequencies, determine a frequency at which a communication network operates a radio cell within the set of candidate frequencies, exclude a sub-set with a predetermined size of frequencies around the determined frequency from the set of candidate frequencies to generate an updated set of candidate frequencies and continue to search for a further frequency at which a communication network operates a radio cell within the updated set of candidate frequencies.

The cell searcher 401 may for example perform the cell search by processing signals received from an antenna 402 via a receiver 403. The set of candidate frequencies, the updated set of candidate frequencies and the predetermined size may for example be stored in a memory 404.

The components of the communication terminal (e.g. the cell searcher) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The following examples pertain to further embodiments.

Example 1 is a cell search method as illustrated in FIG. 3.

In Example 2, the subject matter of Example 1 can optionally include determining the size around the determined frequency based on an expected bandwidth of the radio cell operated at the frequency.

In Example 3, the subject matter of Example 2 can optionally include receiving system information of the radio cell operated at the frequency and determining the expected bandwidth based on the system information.

In Example 4, the subject matter of any one of Examples 2-3 can optionally include determining the size around the frequency to exclude the frequencies which lie within the expected bandwidth of the radio cell.

In Example 5, the subject matter of any one of Examples 2-4 can optionally include determining the size around the frequency to exclude only frequencies which lie within the expected bandwidth of the radio cell.

In Example 6, the subject matter of any one of Examples 2-5 can optionally include determining the size around the determined frequency based on an expected bandwidth of the radio cell operated at the frequency and an expected minimum bandwidth of the radio cells operated at any one of the candidate frequencies.

In Example 7, the subject matter of Example 6 can optionally include determining the size around the determined frequency as a weighted sum of the expected bandwidth of the radio cell operated at the frequency and the expected minimum bandwidth.

In Example 8, the subject matter of any one of Examples 6-7 can optionally include determining the size around the determined frequency as the sum of half the expected bandwidth of the radio cell operated at the frequency and a predetermined percentage of half the expected minimum bandwidth.

In Example 9, the subject matter of any one of Examples 1-8 can optionally include determining whether the radio cell operated at the determined frequency fulfills a predetermined cell selection criterion and comprising continuing to search for the further frequency if the radio cell does not fulfill the predetermined cell selection criterion.

In Example 10, the subject matter of Example 9 can optionally include the cell selection criterion is whether the radio cell is operated by a desired operator.

In Example 11, the subject matter of any one of Examples 1-10 can optionally include determining the set of candidate frequencies from a predetermined initial set of candidate frequencies.

In Example 12, the subject matter of any one of Examples 1-11 can optionally include determining the initial set of candidate frequencies includes determining a frequency band to be searched and excluding frequencies according to a predetermined exclusion criterion.

In Example 13, the subject matter of Example 12 can optionally include a frequency being excluded if the frequency is within a band edge forbidden to be used for radio cell carrier frequencies.

In Example 14, the subject matter of any one of Examples 11-13 can optionally include determining the set of candidate frequencies including determining, for each frequency of the initial set of candidate frequencies, a probability value representing an estimated probability that a radio cell is operated at the frequency.

In Example 15, the subject matter of Examples 14 can optionally include determining the probability value by an auto-correlation of a signal received at the frequency.

In Example 16, the subject matter of any one of Examples 14-15 can optionally include determining the probability value by a cross-correlation of a signal received at the frequency with a predetermined signal.

In Example 17, the subject matter of Example 16 can optionally include the predetermined signal being a predetermined synchronization signal.

In Example 18, the subject matter of any one of Examples 1-17 can optionally further include adjusting the probability values based on radio cell operation information.

In Example 19, the subject matter of Example 18 can optionally include the radio cell operation information including at least one of information about one or more frequencies at which a radio cell is operated, information about bandwidths of operated radio cells and information about patterns of frequencies at which radio cells are likely to be operated.

In Example 20, the subject matter of any one of Examples 14-17 can optionally include determining the set of candidate frequencies further including filtering the probability values.

In Example 21, the subject matter of any one of Examples 14-17 can optionally include determining the set of candidate frequencies further including detecting peaks within the probability values and including the frequencies in the set of candidate frequencies for which a peak has been detected.

In Example 22, the subject matter of any one of Examples 1-21 may optionally further include ordering the frequencies of the set of candidate frequencies to generate an ordered list of candidate frequencies and searching for the frequency at which a communication network operates a radio cell within a predetermined set of candidate frequencies according to the ordering.

In Example 23, the subject matter of Example 22 can optionally include each candidate frequency being associated with a probability value representing an estimated probability that a radio cell is operated at the frequency and the candidate frequencies are ordered in order of decreasing probability values.

Example 24 is a computer readable medium having recorded instructions thereon which, when executed by a processor, make the processor perform a cell search method according to any one of Examples 1 to 23.

Example 25 is a communication terminal as illustrated in FIG. 4.

In Example 26, the subject matter of Example 25 can optionally include the cell searcher being further configured to determine the size around the determined frequency based on an expected bandwidth of the radio cell operated at the frequency.

In Example 27, the subject matter of Example 26 can optionally include the cell searcher being further configured to receive system information of the radio cell operated at the frequency and determine the expected bandwidth based on the system information.

In Example 28, the subject matter of any one of Examples 26-27 can optionally include the cell searcher being further configured to determine the size around the frequency to exclude the frequencies which lie within the expected bandwidth of the radio cell.

In Example 29, the subject matter of any one of Examples 26-28 can optionally include the cell searcher being further configured to determine the size around the frequency to exclude only frequencies which lie within the expected bandwidth of the radio cell.

In Example 30, the subject matter of any one of Examples 26-29 can optionally include the cell searcher being further configured to determine the size around the determined frequency based on an expected bandwidth of the radio cell operated at the frequency and an expected minimum bandwidth of the radio cells operated at any one of the candidate frequencies.

In Example 31, the subject matter of Example 30 can optionally include the cell searcher being further configured to determine the size around the determined frequency as a weighted sum of the expected bandwidth of the radio cell operated at the frequency and the expected minimum bandwidth.

In Example 32, the subject matter of Example 30 can optionally include the cell searcher being further configured to determine the size around the determined frequency as the sum of half the expected bandwidth of the radio cell operated at the frequency and a predetermined percentage of half the expected minimum bandwidth.

In Example 33, the subject matter of any one of Examples 25-32 can optionally include the cell searcher being further configured to determine whether the radio cell operated at the determined frequency fulfills a predetermined cell selection criterion and to continue to search for the further frequency if the radio cell does not fulfill the predetermined cell selection criterion.

In Example 34, the subject matter of Example 33 can optionally include the cell selection criterion being whether the radio cell is operated by a desired operator.

In Example 35, the subject matter of any one of Examples 25-34 can optionally include the cell searcher being further configured to determine the set of candidate frequencies from a predetermined initial set of candidate frequencies.

In Example 36, the subject matter of any one of Examples 25-35 can optionally include determining the initial set of candidate frequencies including determining a frequency band to be searched and excluding frequencies according to a predetermined exclusion criterion.

In Example 37, the subject matter of Example 36 can optionally include a frequency being excluded if the frequency is within a band edge forbidden to be used for radio cell carrier frequencies.

In Example 38, the subject matter of any one of Examples 35-37 can optionally include determining the set of candidate frequencies includes determining, for each frequency of the initial set of candidate frequencies, a probability value representing an estimated probability that a radio cell is operated at the frequency.

In Example 39, the subject matter of Example 38 can optionally include the cell searcher being further configured to determine the probability value by an auto-correlation of a signal received at the frequency.

In Example 40, the subject matter of any one of Examples 38-39 can optionally include the cell searcher being further configured to determine the probability value by a cross-correlation of a signal received at the frequency with a predetermined signal.

In Example 41, the subject matter of Example 40 can optionally include the predetermined signal being a predetermined synchronization signal.

In Example 42, the subject matter of any one of Examples 25-41 can optionally include the cell searcher being further configured to adjust the probability values based on radio cell operation information.

In Example 43, the subject matter of Example 42 can optionally include the radio cell operation information including at least one of information about one or more frequencies at which a radio cell is operated, information about bandwidths of operated radio cells and information about patterns of frequencies at which radio cells are likely to be operated.

In Example 44, the subject matter of any one of Examples 42-43 can optionally include determining the set of candidate frequencies further including filtering the probability values.

In Example 45, the subject matter of any one of Examples 42-44 can optionally include determining the set of candidate frequencies further including detecting peaks within the probability values and including the frequencies in the set of candidate frequencies for which a peak has been detected.

In Example 46, the subject matter of any one of Examples 25-45 can optionally include the cell searcher being further configured to order the frequencies of the set of candidate frequencies to generate an ordered list of candidate frequencies and to search for the frequency at which a communication network operates a radio cell within a predetermined set of candidate frequencies according to the ordering.

In Example 47, the subject matter of Example 46 can optionally include each candidate frequency being associated with a probability value representing an estimated probability that a radio cell is operated at the frequency and the cell searcher being configured to order the candidate frequencies in order of decreasing probability values.

Example 48 is a communication terminal comprising a cell searching means for searching for a frequency at which a communication network operates a radio cell within a predetermined set of candidate frequencies; determining a frequency at which a communication network operates a radio cell within the set of candidate frequencies; excluding a sub-set with a predetermined size of frequencies around the determined frequency from the set of candidate frequencies to generate an updated set of candidate frequencies; and continuing to search for a further frequency at which a communication network operates a radio cell within the updated set of candidate frequencies.

In Example 49, the subject matter of Example 48 can optionally include the cell searching means being further for determining the size around the determined frequency based on an expected bandwidth of the radio cell operated at the frequency.

In Example 50, the subject matter of Example 49 can optionally include the cell searching means being further for receiving system information of the radio cell operated at the frequency and determining the expected bandwidth based on the system information.

In Example 51, the subject matter of Examples 49 can optionally include the cell searching means being further for determining the size around the frequency to exclude the frequencies which lie within the expected bandwidth of the radio cell.

In Example 52, the subject matter of any one of Examples 49-51 can optionally include the cell searching means being further for determining the size around the frequency to exclude only frequencies which lie within the expected bandwidth of the radio cell.

In Example 53, the subject matter of any one of Examples 49-52 can optionally include the cell searching means being further for determining the size around the determined frequency based on an expected bandwidth of the radio cell operated at the frequency and an expected minimum bandwidth of the radio cells operated at any one of the candidate frequencies.

In Example 54, the subject matter of Example 53 can optionally include the cell searching means being further for determining the size around the determined frequency as a weighted sum of the expected bandwidth of the radio cell operated at the frequency and the expected minimum bandwidth.

In Example 55, the subject matter of any one of Examples 53-54 can optionally include the cell searching means being further for determining the size around the determined frequency as the sum of half the expected bandwidth of the radio cell operated at the frequency and a predetermined percentage of half the expected minimum bandwidth.

In Example 56, the subject matter of any one of Examples 48-55 can optionally include the cell searching means being further for determining whether the radio cell operated at the determined frequency fulfills a predetermined cell selection criterion and for continuing to search for the further frequency if the radio cell does not fulfill the predetermined cell selection criterion.

In Example 57, the subject matter of Example 56 can optionally include the cell selection criterion being whether the radio cell is operated by a desired operator.

In Example 58, the subject matter of any one of Examples 48-57 can optionally include the cell searching means being further for determining the set of candidate frequencies from a predetermined initial set of candidate frequencies.

In Example 59, the subject matter of any one of Examples 48-58 can optionally include determining the initial set of candidate frequencies including determining a frequency band to be searched and excluding frequencies according to a predetermined exclusion criterion.

In Example 60, the subject matter of any one of Examples 49-59 can optionally include a frequency being excluded if the frequency is within a band edge forbidden to be used for radio cell carrier frequencies.

In Example 61, the subject matter of any one of Examples 58-60 can optionally include determining the set of candidate frequencies including determining, for each frequency of the initial set of candidate frequencies, a probability value representing an estimated probability that a radio cell is operated at the frequency.

In Example 62, the subject matter of Examples 61 can optionally include the cell searching means being further for determining the probability value by an auto-correlation of a signal received at the frequency.

In Example 63, the subject matter of any one of Examples 61-62 can optionally include the cell searching means being further for determining the probability value by a cross-correlation of a signal received at the frequency with a predetermined signal.

In Example 64, the subject matter of Example 63 can optionally include the predetermined signal being a predetermined synchronization signal.

In Example 65, the subject matter of any one of Examples 48-64 can optionally include the cell searching means being further for adjusting the probability values based on radio cell operation information.

In Example 66, the subject matter of Example 65 can optionally include the radio cell operation information including at least one of information about one or more frequencies at which a radio cell is operated, information about bandwidths of operated radio cells and information about patterns of frequencies at which radio cells are likely to be operated.

In Example 67, the subject matter of any one of Examples 65-66 can optionally include determining the set of candidate frequencies further including filtering the probability values.

In Example 68, the subject matter of any one of Examples 65-67 can optionally include determining the set of candidate frequencies further including detecting peaks within the probability values and including the frequencies in the set of candidate frequencies for which a peak has been detected.

In Example 69, the subject matter of any one of Examples 48-68 can optionally include the cell searching means being further for ordering the frequencies of the set of candidate frequencies to generate an ordered list of candidate frequencies and for searching for the frequency at which a communication network operates a radio cell within a predetermined set of candidate frequencies according to the ordering.

In Example 70, the subject matter of Example 69 can optionally include each candidate frequency being associated with a probability value representing an estimated probability that a radio cell is operated at the frequency and the cell searcher means being for ordering the candidate frequencies in order of decreasing probability values.

It should be noted that one or more of the features of any of the examples above may be combined with any one of the other examples.

In the following, examples are described in more detail.

Figure 5:
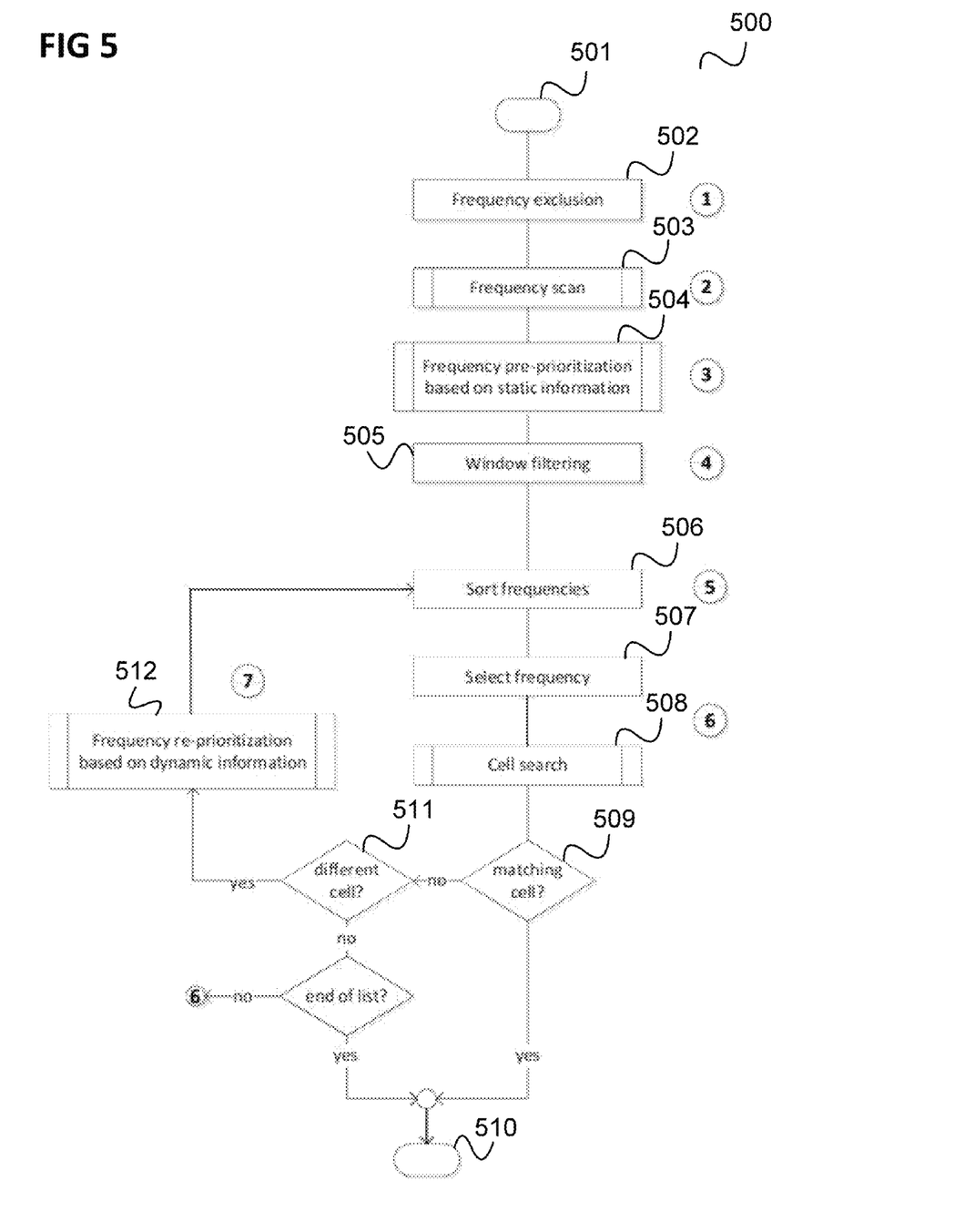
FIG. 5 shows a flow diagram illustrating a cell search procedure.

FIG. 5 shows a flow diagram 500 illustrating a cell search procedure carried out by a communication terminal, e.g. mobile terminal 105.

The procedure starts in 501.

In 502, the communication terminal excludes certain frequencies from the search. For example, the frequencies at a certain interval within the boundaries of the considered band may be excluded since operators are not allowed to operate cells within these intervals.

In 503, the communication terminal performs a frequency scan on the considered band (without the excluded frequencies).

In 504, the communication terminal performs a frequency pre-prioritization based on static information.

For example, each frequency is associated with a probability value which may be increased for prioritization of the frequency. For example, the communication terminal may consider radio cell operation information, e.g. history information and physical characteristics of detected cells, as follows for a prioritization:

The communication terminal may track information about cell frequencies which have been used in the past. It may compare these frequencies to the frequencies of 503 and in case of a match for a frequency increase the probability value associated with the frequency.

The communication terminal may increase the probability values of center frequencies inside the possible channel bandwidth(s) of the used radio access technology: It can be expected that operators in most of the cases evenly distribute the carrier frequencies among the band. Therefore, the communication terminal may divide the frequency band into several parts, each part of the size of one possible channel bandwidth. The communication terminal may compare the frequencies in the middle of these parts with the list of 503 and in case of a match for a frequency increase the probability value of the frequency. In cases where the used radio access technology provides multiple possible channel bandwidths, this may be carried out for each possible channel bandwidth.

The communication terminal may consider neighboring cell information from its current serving cell (if any) to increase probability values.

For example, the communication terminal may give an increased priority to frequencies which can be expected to be used for a radio cell according to the respective radio access technology. For example, LTE operators typically operate radio cells at frequencies that lie on a 2.5 MHz pattern (which arises from the channel bandwidth typically used by operators for a radio cell). Accordingly, the communication terminal may place a 2.5 MHz pattern onto the considered frequency band and give an increased priority to frequencies within the considered frequency band that fit the 2.5 MHz pattern.

Similarly, the communication terminal may prioritize frequencies that lie within a 2.5 MHz pattern of a frequency for which it is known that a cell is operated. This is illustrated in FIG. 6.

Figure 6:
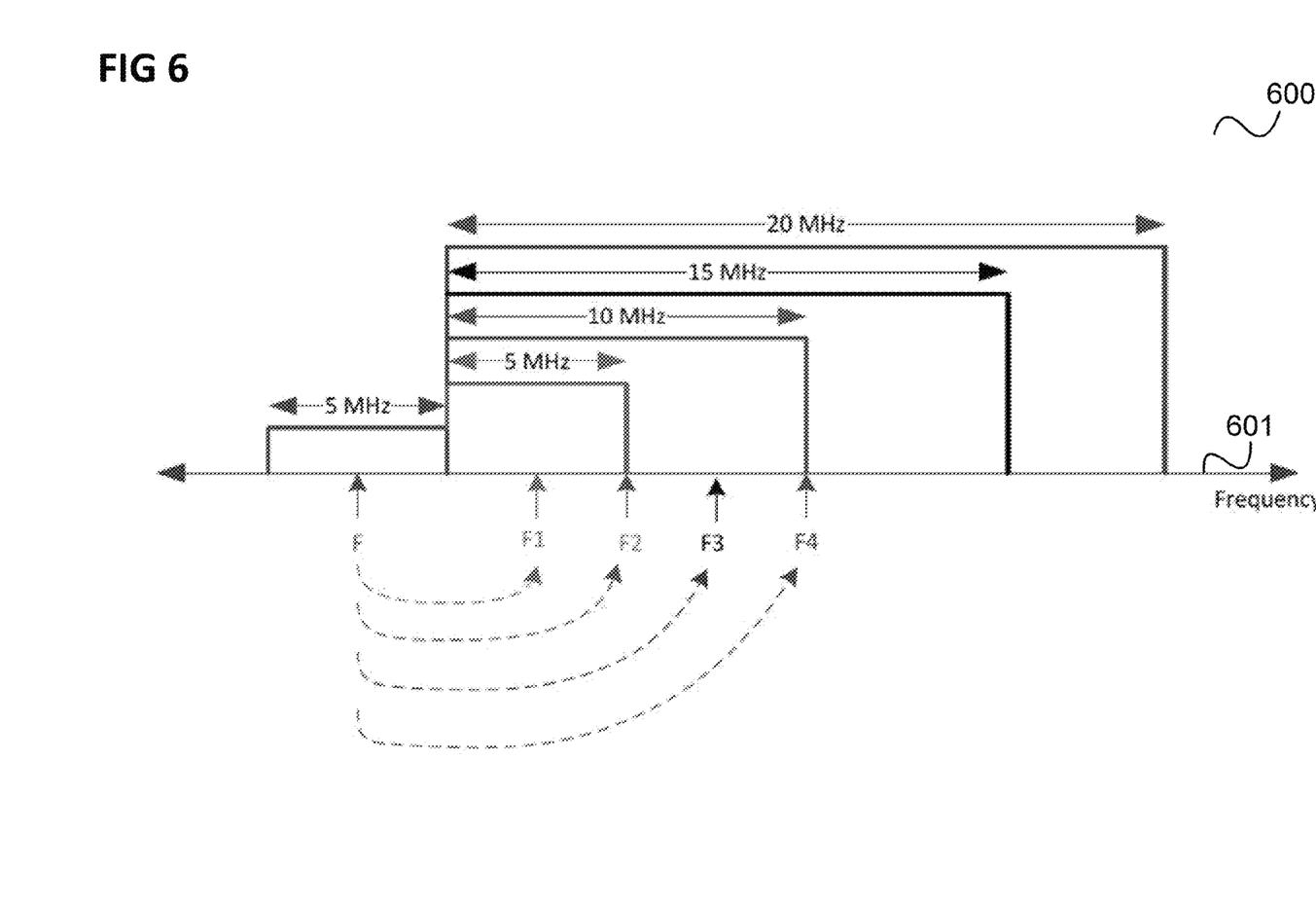
FIG. 6 shows a frequency diagram.

FIG. 6 shows a frequency diagram 600.

Frequency increases from left to right along a frequency axis 601.

It is assumed that the communication terminal knows that a radio cell is operated at frequency F. For example, it may get this information from a neighbor cell list provided by the operator. It may then prioritize frequencies F1, F2, F3, F4 which lie within a 2.5 MHz pattern of the frequency F. In this example, the communication terminal does not prioritize the frequency F+2.5 MHz since it knows that the channel bandwidth of the radio cell operated at frequency F is 5 MHz so the operator does not operate a radio cell at F+2.5 MHz (i.e. there is no room for a cell at F+2.5 MHz).

For example, each frequency has an associated priority value (e.g. a value reflecting the probability that this frequency carries a cell, i.e. that a cell is operated at this frequency) and the communication terminal may prioritize a frequency by increasing this priority value (e.g. by a certain percentage, e.g. 15%).

In 505, the communication terminal performs a window filtering on the considered frequency band to reduce the number of candidate frequencies.

As mentioned above to limit the number of frequency candidates, a correlation function (e.g. auto-correlation) may be used. This allows a better suppression of noise and interference impact than based on RSSI. The priority value of a frequency that may be increased in 504 may for example be the correlation value (or probability value) for this frequency as determined in 503.

In this case, the output of the correlation based scan in 503 is a list of pairs of frequency and related probability value for that frequency determined by the correlation function.

Alternatively, a cross-correlation function may be used during the frequency scan in 503. For example, for each frequency, the signal received at the frequency is correlated with a predetermined signal, e.g. an expected synchronization signal, e.g. an expected primary correlation signal. In this case, the output of this cross-correlation based frequency scan in 503 is a list of pairs of frequency and a parameter representing the probability for that frequency to carry a cell. A cross-correlation may allow a more precise evaluation of the probability value since for those frequencies with a high probability to carry a cell, the determined probability value typically contrasts strongly with those frequencies with a lower probability to carry a cell. In other words, the probabilities for the list of candidate frequencies list contains sharp peaks as it is illustrated in FIG. 7.

Figure 7:
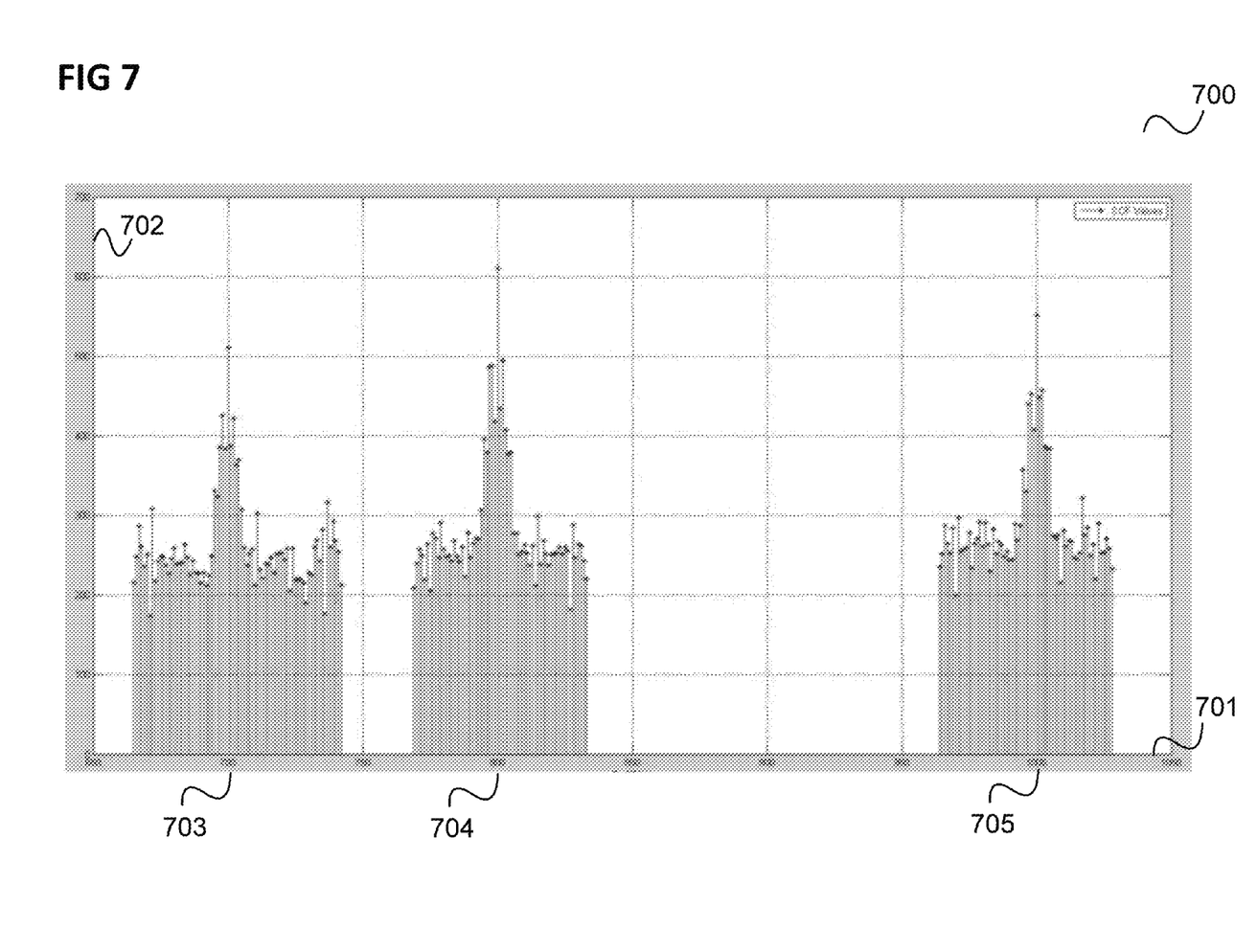
FIG. 7 shows a frequency-probability value diagram.

FIG. 7 shows a frequency-probability value diagram 700.

The frequencies of the considered frequency band increase from left to right along a frequency axis 701. For each frequency, a probability value (e.g. a cross-correlation value CCF, possibly increased in 504) is indicated, wherein the probability values increase from bottom to top along a probability axis 702. As can be seen, there are sharp peaks at frequencies 703, 704 and 705.

The usage of a cross-correlation function compared to the usage of an autocorrelation may lead to a higher time consumption for the frequency scan itself in 503. Therefore, the frequency exclusion in 502 may be performed as a countermeasure to the increased time consumption right at the beginning of the search procedure; i.e. before the frequency scan is initiated. In 502, the number of frequencies which are scanned is reduced upfront. As mentioned above, for this reduction, information like the current cell's channel bandwidth and specification requirements like frequency deployments at the band edges may be considered.

Based on the characteristic of the cross-correlation function which provides with sharp peaks the communication terminal applies a filter function in 504 to identify the peaks. For example, the filter sweeps a sliding window of a certain size through the considered band and identifies whether a maximum value or a second best value for the window is currently in the middle of the window. When this condition is fulfilled, this peak (or second best value) is put in relation to the remainder of the window range. If a certain ratio between the peak and the averaged remainder of the window's values is reached then the current value is identified to be a sharp peak.

The communication terminal may then determine the candidate list to include all frequencies for which a peak has been identified, i.e. which match the filter criteria.

In 506, the communication terminal sorts the candidate list by decreasing probability values.

In 507, the communication terminal selects, from the sorted list of candidates, beginning with the candidate frequency with highest probability value, a frequency and initiates the actual cell search in 508 on that frequency. The cell search for example includes detection of primary and secondary synchronization signals, reading of system information (e.g. the first system information block SIB1) etc.

The communication terminal may thus successively check the candidate frequencies until a cell has been found.

In this example, it is checked in 509 whether a cell of the communication terminal's desired operator (or the desired RAT) has been found. If this is the case, the procedure is (successfully) ended in 510. If this is not the case, it is checked in 511 if a cell of a different operator (or RAT) has been found. If no cell has been found and the end of the list of candidate frequencies has been reached, the procedure is (unsuccessfully) ended in 510. If the end of the list of candidate frequencies has not been reached, the cell search is continued with the next frequency on the list of candidate frequencies.

If a cell operated by a different operator has been found the communication terminal performs a re-prioritization of the candidate frequencies in 512. For this, information from the cell may be used. For example, the communication terminal may perform a re-prioritization similar to the pre-prioritization of 504 but taking into account the information about the found cell. For example, as described with reference to 504, the communication terminal may increase the priority of frequencies that lie within a 2.5 MHz pattern of the frequency of the cell found.

Further, the communication terminal may for example exclude candidate frequencies (e.g. assign a priority value of zero) to frequencies that lie within the bandwidth used by the cell found.

After the re-prioritization, the communication terminal sorts the list candidate frequencies according to the new priorities (with some candidate frequencies being possibly excluded) and continues the search process on the resulting updated sorted candidate frequency list.

The search procedure including frequency exclusion, filtering and prioritization/ranking of remaining frequency candidates allows a significant reduction of cell search times in real world scenarios.

When the sorting of 506 is omitted and frequencies are for example simply searched from low frequency to high frequency (e.g. from left to right in FIG. 7) the re-prioritization may be directly taken into account in the filtering of 505. This allows reducing the time necessary for filtering. A corresponding process is illustrated in FIG. 8.

Figure 8:
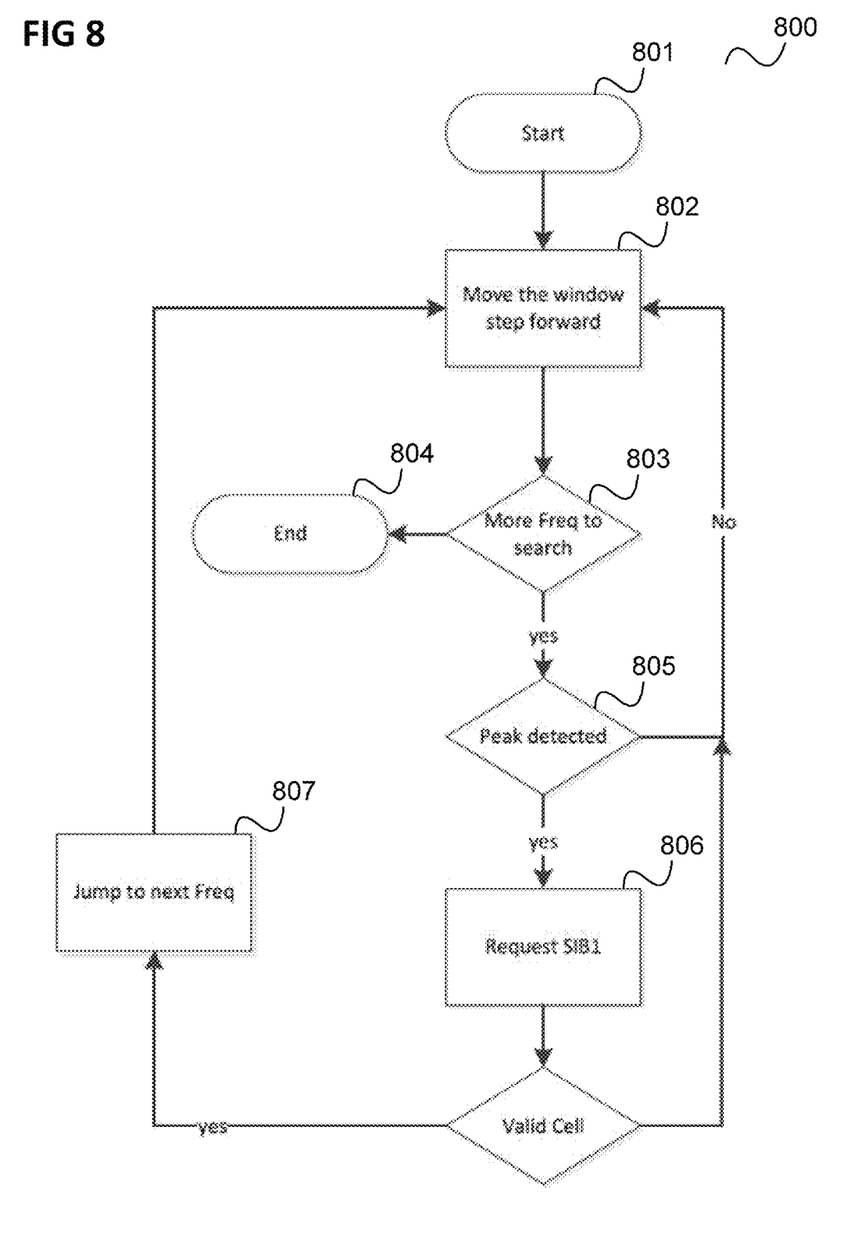
FIG. 8 shows a flow diagram illustrating a cell search procedure.

FIG. 8 shows a flow diagram 800 illustrating a cell search procedure.

The process starts in 801. For example, 502 to 504 have been carried out before the cell search procedure illustrated in FIG. 8.

In 802, the communication terminal moves a filter window in the considered frequency band (e.g. with some frequencies, e.g. at the borders, being excluded) forward. In this example, the considered band is divided into portions according to the window size and in 802, the window moves to the next portion. For the first iteration of 802, it sets the window at the beginning of the considered frequency band (i.e. the first portion).

In 803 it is checked whether there are frequencies left to search (or, e.g. the window has moved out of the considered frequency band previously was at the last portion). If there are no frequencies left to search, the process ends in 804.

If there are frequencies left to search, the communication terminal determines whether it detects a peak within the window 805. If it does not detect a peak, it continues the process with 802.

If it detects a peak within the window at a certain frequency, it performs a cell search for this frequency in 806, e.g. by trying to decode the primary and secondary synchronization signals, requesting the first system information blocks (e.g. MIB & SIB1) etc. If it does not find a cell at this frequency, it continues the process with 802.

If it does find a cell at this frequency, it performs a frequency jump in 807 and continues the process with 802. For example, the communication terminal performs a frequency jump in 807 and moves the window forward in 802 such that the window lies outside the bandwidth used for the cell found. This is illustrated in FIG. 9.

Figure 9:
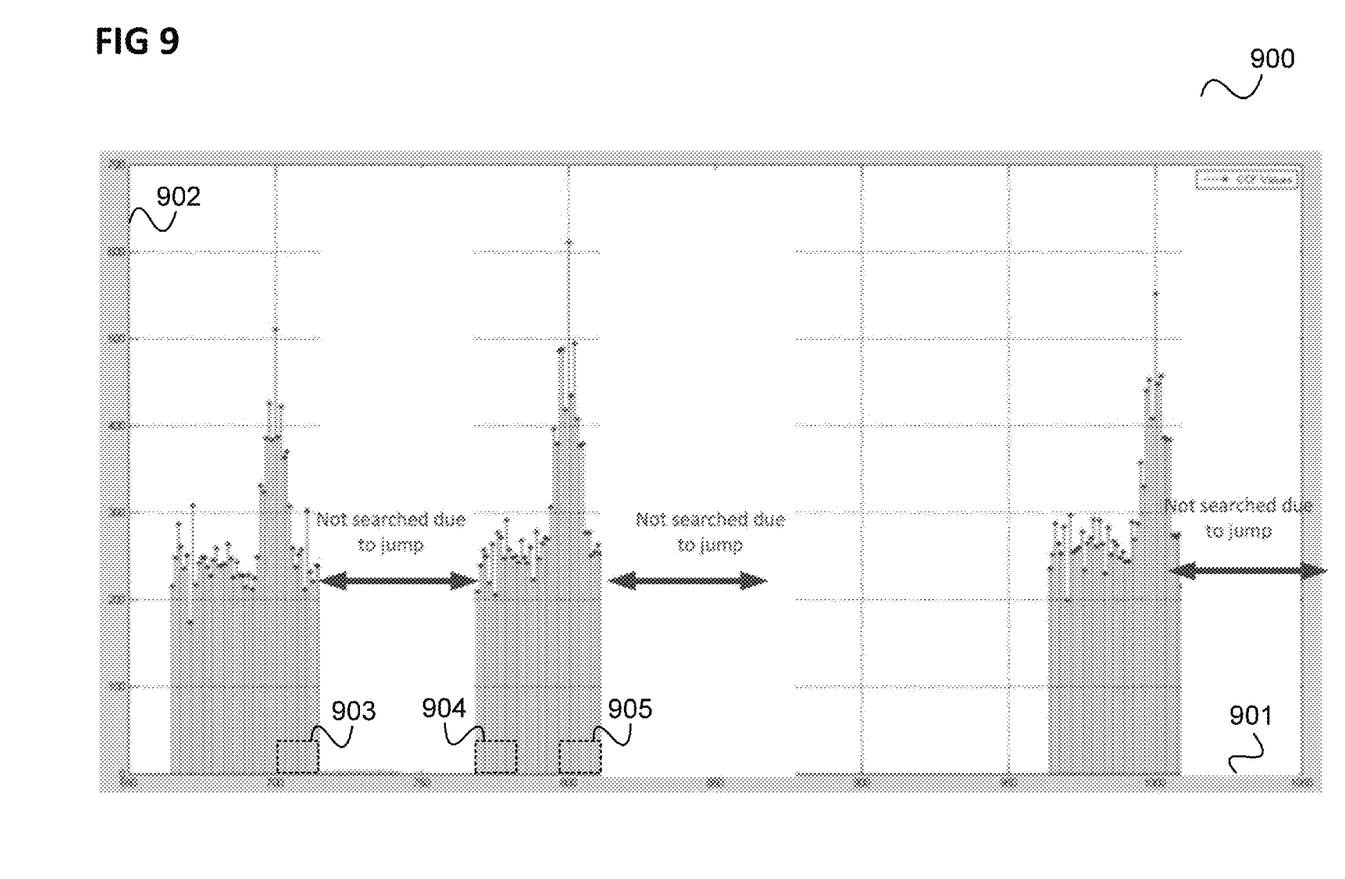
FIG. 9 shows a frequency-probability value diagram.

FIG. 9 shows a frequency-probability value diagram 900.

As in FIG. 7, the frequencies of the considered frequency band increase from left to right along a frequency axis 901 and the probability values given for frequencies increase from bottom to top along a probability axis 902. The probability values given correspond to the probability values given in FIG. 7 wherein no probability value is given for frequencies which are omitted in the search.

The communication terminal moves the filter (or search) window from left to right step by step until it finds a peak. When it has found a cell, e.g. at a first window position 903, it performs a jump to a second position 904. It then continues until it finds another cell, e.g. at a third position 905 and jumps again and so on. The jump distance may for example depend on the bandwidth of the found cell which the communication terminal may determine from the system information (e.g. MIB) of the found cell. For example, the communication terminal may choose the jump distance such that the window after 807 and 802 is just outside the bandwidth of the found cell or skips as many portions of the considered frequency band as possible without skipping frequencies that lie outside the bandwidth of the found cell. The jump distance may also be determined based on one or both of the bandwidth of the found cell BW and the minimum cell bandwidth minBW. This is illustrated in FIG. 10.

Figure 10:
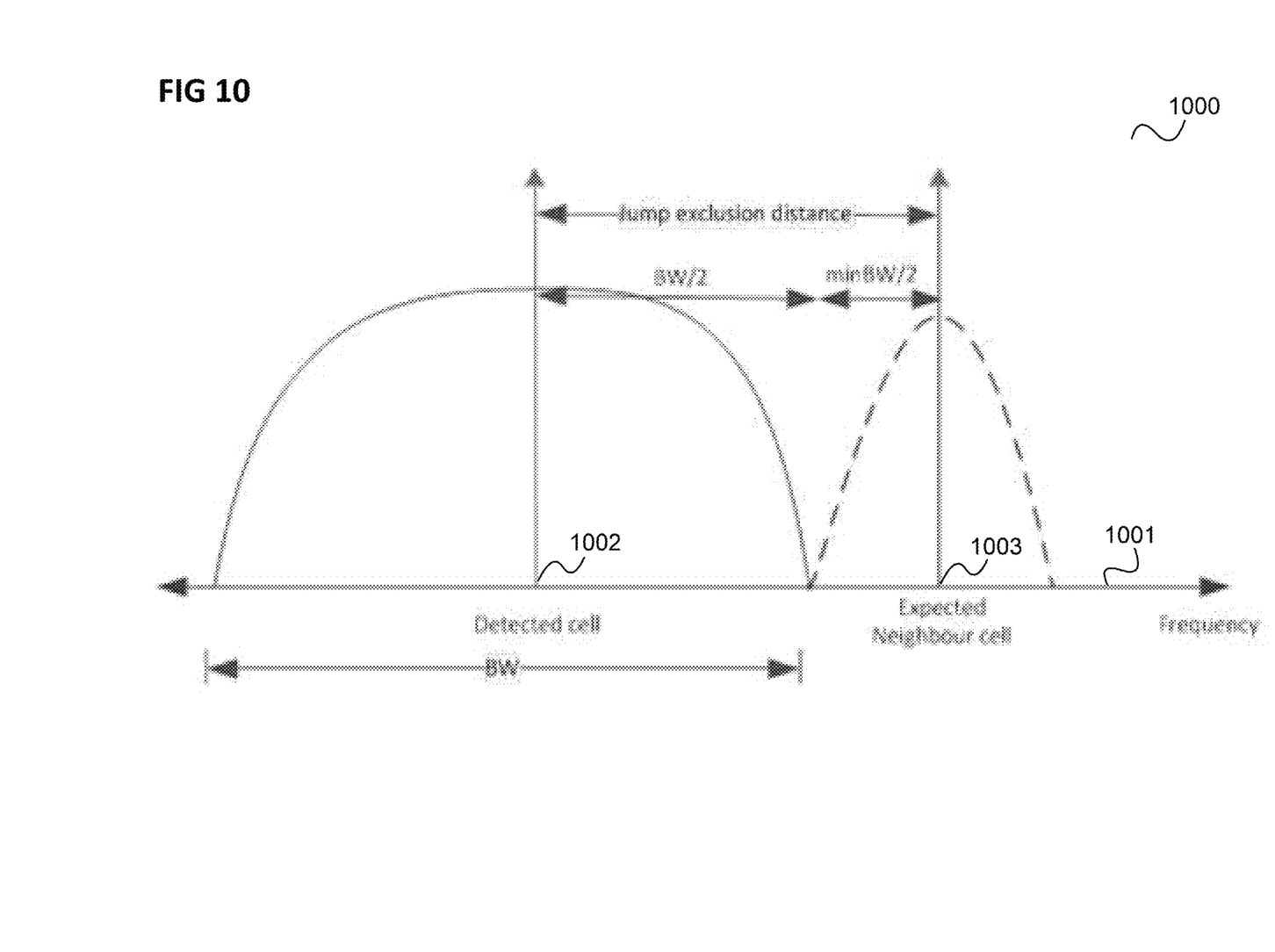
FIG. 10 shows a frequency diagram.

FIG. 10 shows a frequency diagram 1000.

Frequency increases from left to right along a frequency axis 1001.

It is assumed that the communication terminal has detected a radio cell at a first frequency 1002 which has a bandwidth BW.

A neighboring cell, e.g. operated at a second frequency 1003 for example has a minimum bandwidth minBW. Thus, the spectral distance between the first frequency 1002 and the second frequency 1003 is at least BW/2+minBW/2.

Thus, the communication terminal may for example calculate the jump distance as 0.5*BW+0.5*minBW to ensure that a cell lying next to the found cell (in the spectrum) and is operated with the bandwidth minBW can be found. If, for example, the communication terminal has detected a cell with a bandwidth of BW=10 MHz and minBW=5 MHz in the considered band (1.4 MHz is the smallest possible minBW in LTE and 5 MHz is typical value; possible values are: 1.4, 3, 5, 10, 15 and 20 MHz; these min values are specifically defined per band by 3GPP (Third Generation Partnership Project)), the communication terminal determines the jump distance as 0.5*10 MHz (upper half of detected cell)+0.5*5 MHz (half of minimum possible channel bandwidth used in that band)=7.5 MHz.

The jumping can be seen as a re-prioritization or an exclusion of frequencies from the candidate list.

It should be noted that while the above examples relate to use cases where the communication terminal tries to find a radio cell operated by a particular operator only, the above approaches may also be used for use cases where the mobile terminal searches for all available mobile communication networks, e.g. PLMNs (Public Land Mobile Networks), i.e. for PLMN Search instead of PLMN Selection.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A cell search method comprising:
   acquiring at least one frequency from a frequency scan at which a communication network operates a radio cell;
   sorting the at least one acquired frequency from the frequency scan to form a predetermined set of candidate frequencies based on
      a probability value representing an estimated probability that a radio cell will operate at a particular frequency;
   excluding a sub-set with a predetermined size of frequencies around the at least one sorted frequency from the set of candidate frequencies to generate an updated set of candidate frequencies; and
   continuing to search for a further frequency at which a communication network operates a radio cell within the updated set of candidate frequencies.

2. The method according to claim 1, comprising determining the size around the determined frequency based on an expected bandwidth of the radio cell operated at the frequency.

3. The method according to claim 2, comprising receiving system information of the radio cell operated at the frequency and determining the expected bandwidth based on the system information.

4. The method according to claim 2, comprising determining the size around the frequency to exclude the frequencies which lie within the expected bandwidth of the radio cell.

5. The method according to claim 2, comprising determining the size around the frequency to exclude only frequencies which lie within the expected bandwidth of the radio cell.

6. The method according to claim 2, comprising determining the size around the determined frequency based on an expected bandwidth of the radio cell operated at the frequency and an expected minimum bandwidth of the radio cells operated at any one of the candidate frequencies.

7. The method according to claim 6, comprising determining the size around the determined frequency as a weighted sum of the expected bandwidth of the radio cell operated at the frequency and the expected minimum bandwidth.

8. The method according to claim 6, comprising determining the size around the determined frequency as the sum of half the expected bandwidth of the radio cell operated at the frequency and a predetermined percentage of half the expected minimum bandwidth.

9. The method according to claim 1, comprising determining whether the radio cell operated at the determined frequency fulfills a predetermined cell selection criterion and comprising continuing to search for the further frequency if the radio cell does not fulfill the predetermined cell selection criterion.

10. The method according to claim 9, wherein the cell selection criterion is based on whether the radio cell is operated by a desired operator.

11. The method according to claim 1, wherein the probability value is determined by a cross-correlation of a signal received at the frequency with a predetermined signal.

12. The method according to claim 1, wherein determining the initial set of candidate frequencies includes determining a frequency band to be searched and excluding frequencies according to a predetermined exclusion criterion.

13. The method according to claim 12, wherein a frequency is excluded if the frequency is within a band edge forbidden to be used for radio cell carrier frequencies.

14. The method according to claim 1, wherein the probability value is determined by an auto-correlation of a signal received at the frequency.

15. The method according to claim 14, further comprising applying a filter to the auto-correlation to identify any peaks matching the filter criteria, and updating the set of candidate frequencies to include any frequencies for which a peak is identified.

16. The method according to claim 11, wherein the predetermined signal is based on a predetermined synchronization signal.

17. The method according to claim 11, further comprising applying a filter to the cross-correlation to identify any peaks matching the filter criteria, and updating the set of candidate frequencies to include any frequencies for which a peak is identified.

18. The method according to claim 1, further comprising adjusting the probability values based on radio cell operation information.

19. A computer readable medium having recorded instructions thereon which, when executed by a processor, make the processor perform a cell search method according to any one of claims 1 to 18.

20. A communication terminal comprising:
   a cell searcher circuit configured to
   search for a frequency acquire at least one frequency from a frequency scan at which a communication network operates a radio cell;
   sort the at least one acquired frequency from the frequency scan to form a predetermined set of candidate frequencies based on
      a probability value representing an estimated probability that a radio cell will operate at a particular frequency;
   exclude a sub-set with a predetermined size of frequencies around the at least one sorted frequency from the set of candidate frequencies to generate an updated set of candidate frequencies; and
   continue to search for a further frequency at which a communication network operates a radio cell within the updated set of candidate frequencies.

* * * * *